Oct. 31, 1950

L. T. BLASEN 2,527,697

ANIMAL TRAP

Filed Aug. 7, 1947

INVENTOR.
Louis T. Blasen
BY
Otis A. Earl
Attorney.

Patented Oct. 31, 1950

2,527,697

UNITED STATES PATENT OFFICE 2,527,697

ANIMAL TRAP

Louis T. Blasen, Saranac, Mich.

Application August 7, 1947, Serial No. 766,994

9 Claims. (Cl. 43—74)

This invention relates to improvements in an animal trap.

The principal objects of this invention are:

First, to reduce the friction forces in a trap of the rotatable trap door variety, rendering the operation of the trap smoother and more positive.

Second, to provide automatic resetting mechanism for the triggers of a rotatable trap door animal trap in which the springs for resetting the trigger mechanism may be of reduced strength, rendering the operation of the triggers more sensitive.

Third, to provide spring mechanism for automatically resetting the trigger of a trap in which the springs may be adjusted to various loadings.

Fourth, to provide a mounting for the rotatable trap door unit of an animal trap which is easy to assemble and assures a free and positive operation of the trap.

Other objects and advantages of the invention will be apparent from a consideration of the following description and claims.

The drawings, of which there are two sheets, illustrate the preferred form of my trap and one modified form of the trigger release mechanism therefor.

Fig. 1 is a fragmentary perspective view of the trap partially broken away to illustrate the parts thereof.

Fig. 2 is a fragmentary transverse cross sectional view through the trap door unit and along the line 2—2 in Fig. 3.

Fig. 3 is a fragmentary cross sectional view along the line 3—3 in Fig. 2 and illustrating the connection between the trap door members and their supporting sleeve.

Figure 4:
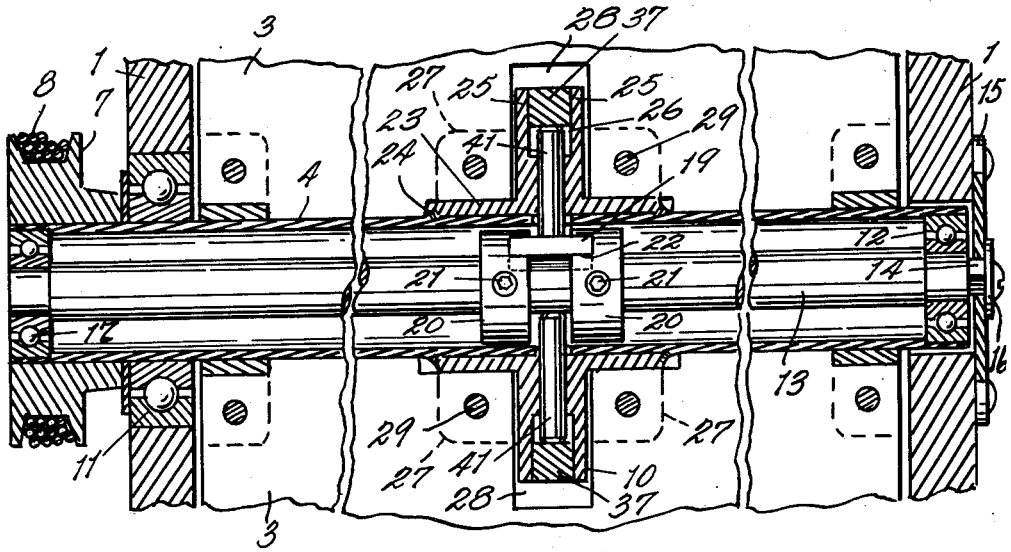
Fig. 4 is a fragmentary transverse cross sectional view along the lines 4—4 in Figs. 1 and 2.

This invention relates to certain improvements in the animal trap described in the patent issued to me April 16, 1940, Serial No. 2,197,121, for Animal Trap.

As in the prior patent referred to above, my present trap comprises a receptacle 1 of any suitable material and size within which is rotatably mounted the trap door unit 2. The trap door unit consists of four trap door members 3 secured to a sleeve 4 which is rotatably mounted in the walls of the receptacle and will be more particularly described presently. The trap door unit 2 is of such a size as to effectively divide the upper portion of the receptacle into two separate chambers one of which is provided with an entrance passage 5, thru which the animals to be trapped may enter. The lower portion of the receptacle 1 below the trap door unit 2 is elongated and provided with an exit opening 6, so that animals dropped into the bottom of the receptacle by operation of the trap door unit may pass freely underneath the depending trap door member into the exit passage 6, from where they may be led to a suitable holding or disposing chamber.

The rotatable sleeve 4 extends thru one wall of the receptacle 1 and carries a pulley 7 around which the cord 8 supporting a weight 9 is wound. Trigger mechanism generally indicated as 10, is provided for releasably holding the trap door unit against rotation under the influence of the weight 9 until the trap is sprung as will be described in detail later.

Figure 5:
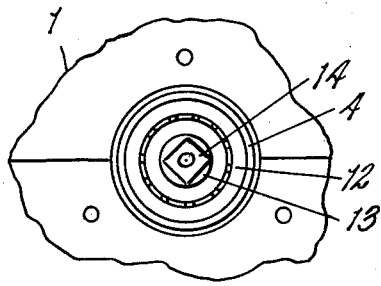
Fig. 5 is a fragmentary end elevation view of the trap door sleeve and spindle as mounted in the trap but with the end supporting plate removed.
Figure 6:
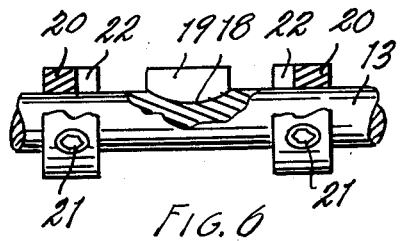
Fig. 6 is a fragmentary elevational view partially broken away in cross sections and illustrating the trap door latch and supporting spindle in partially assembled position.
Figure 7:
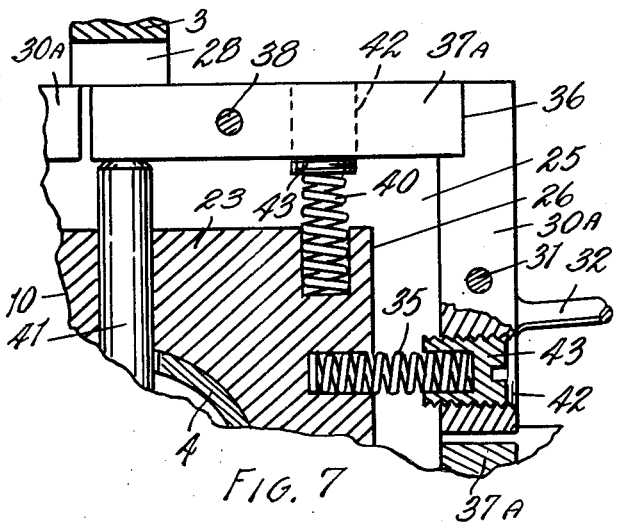
Fig. 7 is a fragmentary transverse cross sectional view similar to Fig. 2 and illustrating a modified form of release mechanism.

Referring to the details of construction and mounting of the tubular sleeve 4 attention is invited to Figs. 4, 5, and 6, which illustrate the sleeve 4 positioned in the walls of the receptacle and extending beyond the left wall for attachment to the pulley 7. The left end of the sleeve 4 is rotatably supported in an anti-friction roller bearing 11 engaging the outer surface of the sleeve and supported in the wall of the receptacle. The right end of the sleeve 4 is supported within the wall of the receptacle by an internal anti-friction roller bearing 12, which is in turn supported on the end of a spindle 13. The right end of the spindle 13 is of angular cross section as at 14 and non-rotatably supported in an end plate 15 secured to the outside of the receptacle. Fig. 5 illustrates the ends of the sleeve and spindle with the end plate 15 removed. A screw and washer 16 are provided for securing the spindle to the end plate.

The left end of the spindle 13 as viewed in Fig. 4, is provided with an anti-friction roller bearing 17 rotatably engaging the inner surface of the sleeve 4. The spindle 13 is thus fixedly supported in the side walls of the receptacle and the sleeve 4 is freely rotatable there around except when restrained by the trigger mechanism 10. The center of the spindle 13 is provided with of said receptacle and extending through the opposite wall, ball bearings positioned on the ends of said spindle and rotatably supporting said tubular support, another ball bearing positioned between said tubular support and said opposite wall, a pulley secured to the end of said tubular support and on the outside of said receptacle, a connecting member for securing said trap door members to said tubular support and being welded to said support, said connecting member having a radially extending flange formed with a radially opening channel and a plurality of axially extending slotted flanges, said trap door members being notched to receive said radial flange and having their edges secured in said slots in said axial flanges, a bait holder associated with each of said trap door members and having a trigger bar pivotally supported in said channel in said radial flange, a latch bar associated with each of said trigger bars and pivotally supported in said channel, said latch bars and trigger bars having coacting latching surfaces, a bolt member associated with each of said latch bars and extending radially through said tubular support to adjacent said spindle, a latch key secured to said spindle and successively engageable with said bolt members to prevent rotation of said trap door unit when said latch bars and trigger bars are engaged, coil springs positioned between the base of said channel and said trigger bars and urging said trigger bars to latched position, and other coil springs positioned between the base of said channel and said latch bars and urging said latch bars toward latched position.

2. In an animal trap having a rotatably mounted trap door unit including a plurality of radially disposed trap door members and a tubular support therefor, the combination of a receptacle for said unit, a spindle fixedly secured to one wall of said receptacle and extending through the opposite wall, anti-friction bearings positioned on the ends of said spindle and rotatably supporting said tubular support, another anti-friction bearing positioned between said tubular support and said opposite wall, a pulley secured to the end of said tubular support, a connecting member secured to said support, said connecting member having a radially extending flange, said trap door members being notched to receive said radial flange, a bait holder associated with each of said trap door members and having a trigger bar pivotally supported on said radial flange, a latch bar associated with each of said trigger bars and pivotally supported on said flange, said latch bars and trigger bars having coacting latching surfaces, a bolt member associated with each of said latch bars and extending radially through said tubular support to adjacent said spindle, a latch secured to said spindle and successively engageable with said bolt members to prevent rotation of said trap door unit when said latch bars and trigger bars are engaged, coil springs positioned between said flange and said trigger bars and urging said trigger bars to latched position, and other coil springs positioned between said flange and said latch bars and urging said latch bars toward latched position.

3. In an animal trap having a rotatably mounted trap door unit including a plurality of radially disposed trap door members and a tubular support therefor, the combination of a receptacle for said unit, a spindle fixedly secured to one wall of said receptacle, anti-friction bearings positioned on the ends of said spindle and rotatably supporting said tubular support, another anti-friction bearing positioned between said tubular support and said opposite wall, a pulley secured to the end of said tubular support and on the outside of said receptacle, a connecting member secured to said support, said trap door members being notched to receive said connecting member, a bait holder associated with each of said trap door members and having a trigger bar pivotally supported on said connecting member, a latch bar associated with each of said trigger bars and pivotally supported on said connecting member, said latch bars and trigger bars having coacting latching surfaces, a bolt member associated with each of said latch bars and extending radially through said tubular support to adjacent said spindle, a projection on said spindle and successively engageable with said bolt members to prevent rotation of said trap door unit when said latch bars and trigger bars are engaged, coil springs positioned between said connecting member and said trigger bars and urging said trigger bars to latched position, and other coil springs positioned between said connecting member and said latch bars and urging said latch bars toward latched position.

4. In an animal trap having a rotatably mounted trap door unit including a plurality of radially disposed trap door members and a tubular support therefor, the combination of a receptacle for said unit, a spindle fixedly secured to one wall of said receptacle, anti-friction bearings positioned on the ends of said spindle and rotatably supporting said tubular support, another anti-friction bearing positioned between said tubular support and said opposite wall, a pulley secured to said tubular support, a connecting member secured to said support, said trap door members being notched to receive said connecting member, a bait holder associated with each of said trap door members and having a trigger bar pivotally supported on said connecting member, a latch bar associated with each of said trigger bars and pivotally supported on said connecting member, said latch bars and trigger bars having coacting latching surfaces, a bolt member associated with each of said latch bars and extending radially through said tubular support to adjacent said spindle, a keeper surface on said spindle and successively engageable with said bolt members to prevent rotation of said trap door unit when said latch bars and trigger bars are engaged, springs positioned between said connecting member and said trigger bars and urging said trigger bars to latched position, and other springs positioned between said connecting member and said latch bars and urging said latch bars toward latched position.

5. In an animal trap having a rotatably mounted trap door unit including a plurality of radially disposed trap door members and a tubular support therefor, the combination of a spindle extending through said support and in supporting engagement therewith, a connecting member for securing said trap door members to said tubular support and being welded to said support, said connecting member having a transversely and radially extending flange formed with a radially opening channel and a plurality of axially extending slotted flanges, said trap door members being notched to receive said radial flange and having their edges secured in said slots in said axial flanges, a bait holder associated with each of said trap door members and having a trigger bar pivotally supported in said channel in said radial flange, a latch bar associated with each of said trigger bars and pivotally supported in said channel, said latch bars and trigger bars having coacting latching surfaces, a bolt member associated with each of said latch bars and extending radially through said tubular support to adjacent said spindle, a latch key on said spindle and successively engageable with said bolt members to prevent rotation of said trap door unit when said latch bars and trigger bars are engaged, coil springs positioned between the base of said channel and said trigger bars and urging said trigger bars to latched position, and other coil springs positioned between the base of said channel and said latch bars and urging said bars toward latched position, said latch bars and trigger bars having adjustable screw abutments for said springs whereby the loading of said springs may be adjusted.

6. In an animal trap having a rotatably mounted trap door unit including a plurality of radially disposed trap door members and a tubular support therefor, the combination of a spindle extending through said support and in supporting engagement therewith, a connecting member for securing said trap door members to said tubular support secured to said support, said connecting member having a transversely and radially extending flange formed with a radially opening channel and a plurality of axially extending slotted flanges, said trap door members being notched to receive said radial flange and having their edges secured in said slots in said axial flanges, a bait holder associated with each of said trap door members and having a trigger bar pivotally supported in said channel in said radial flange, a latch bar associated with each of said trigger bars and pivotally supported in said channel, said latch bars and trigger bars having coacting latching surfaces, a bolt member associated with each of said latch bars and extending radially through said tubular support to adjacent said spindle, a latch element on said spindle and successively engageable with said bolt members to prevent rotation of said trap door unit when said latch bars and trigger bars are engaged, springs positioned between the base of said channel and said trigger bars and urging said trigger bars to latched position, and other springs positioned between the base of said channel and said latch bars and urging said latch bars toward latched position.

7. In an animal trap having a rotatably mounted trap door unit including a plurality of radially disposed trap door members and a tubular support therefor, the combination of a spindle extending through said support and in supporting engagement therewith, a connecting member secured to said support, said connecting member having a radially extending flange formed with a radially opening channel, said trap door members being notched to receive said radial flange, a bait holder associated with each of said trap door members and having a trigger bar pivotally supported in said channel in said radial flange, a latch bar associated with each of said trigger bars and pivotally supported in said channel, said latch bars and trigger bars having coacting latching surfaces, a bolt member associated with each of said latch bars and extending radially through said tubular support to adjacent said spindle, a latch member projecting from said spindle and successively engageable with said bolt members to prevent rotation of said trap door unit when said latch bars and trigger bars are engaged, coil springs positioned between the base of said channel and said trigger bars and urging said trigger bars to latched position, and other coil springs positioned between the base of said channel and said latch bars and urging said latch bars toward latched position.

8. In an animal trap having a rotatably mounted trap door unit including a plurality of radially disposed trap door members and a tubular support therefor, the combination of a spindle extending through said support and in supporting engagement therewith, a connecting member secured to said support, said trap door members being notched to receive said connecting member, a bait holder associated with each of said trap door members and having a trigger bar pivotally supported on said connecting member, a latch bar associated with each of said trigger bars and pivotally supported on said connecting members, said latch bars and trigger bars having coacting latching surfaces, a bolt member associated with each of said latch bars and extending radially through said tubular support to adjacent said spindle, a keeper surface on said spindle and successively engageable with said bolt members to prevent rotation of said trap door unit when said latch bars and trigger bars are engaged, coil springs positioned between said connecting member and said trigger bars and urging said trigger bars to latched position, and other coil springs positioned between said connecting member and said latch bars and urging said latch bars toward latched position.

9. In an animal trap having a rotatably mounted trap door unit including a plurality of radially disposed trap door members and a tubular support therefor, the combination of a spindle extending through said support and in supporting engagement therewith, a connecting member secured to said support, said trap door members being notched to receive said connecting member, a bait holder associated with each of said trap door members and having a trigger bar pivotally supported on said connecting member, a latch bar associated with each of said trigger bars and pivotally supported on said connecting member, said latch bars and trigger bars having coacting latching surfaces, a bolt member associated with each of said latch bars extending radially through said tubular support to adjacent said spindle, a keeper surface on said spindle and successively engageable with said bolt members to prevent rotation of said trap door unit when said latch bars and trigger bars are engaged, coil springs positioned between said connecting member and said trigger bars and urging said trigger bars to latched position, and other coil springs positioned between said connecting member and said latch bars and urging said latch bars toward latched position, said latch bars and trigger bars having adjustable screw abutments for said springs whereby the loading of said springs may be varied.

LOUIS T. BLASEN.

REFERENCES CITED

The following references are of record in the file of this patent:

UNITED STATES PATENTS

| Number | Name | Date |
| --- | --- | --- |
| 1,090,750 | Peach | Mar. 17, 1914 |
| 2,197,121 | Blasen | Apr. 16, 1940 |

Oct. 31, 1950     A. BORZYM     2,527,698
POWER PRESS
Original Filed Jan. 16, 1947     2 Sheets-Sheet 1
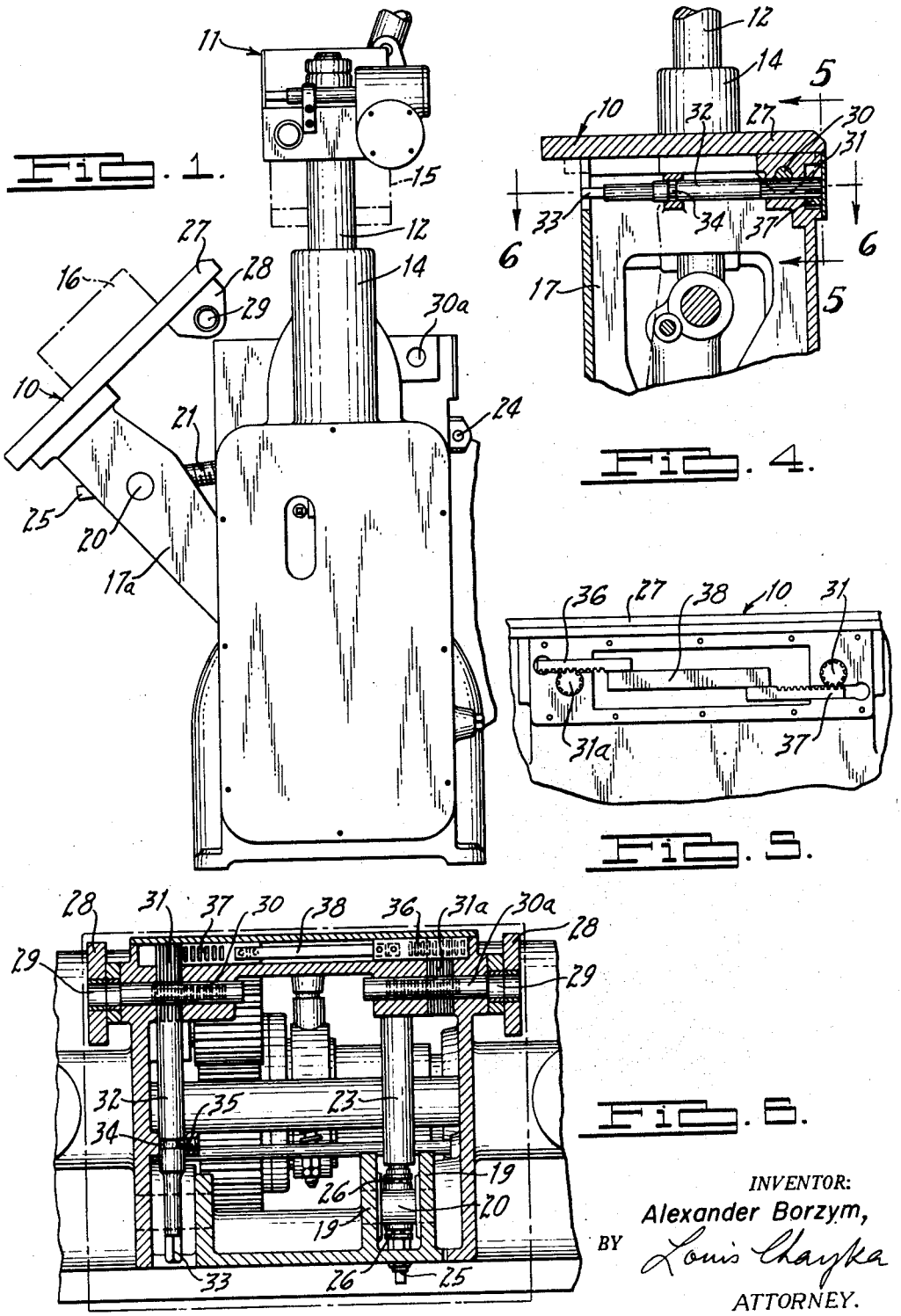
INVENTOR:
Alexander Borzym,
BY Louis Chayka
ATTORNEY.